(12) United States Patent
Barkley (10) Patent No.: US 7,850,113 B1
(45) Date of Patent: Dec. 14, 2010

(54) AUDIO CORD ORGANIZER

(75) Inventor: Julie Johnson Barkley, 16507 Champions Cove Cir., Spring, TX (US) 77379

(73) Assignee: Julie Johnson Barkley, Spring, TX (US)

( * ) Notice: Subject to any disclaimer, the term of this patent is extended or adjusted under 35 U.S.C. 154(b) by 0 days.

(21) Appl. No.: 12/435,844

(22) Filed: May 5, 2009

Related U.S. Application Data (60) Provisional application No. 61/135,250, filed on Jul. 18, 2008.

(51) Int. Cl.
*B65H 75/38* (2006.01)

(52) U.S. Cl. .................. 242/388.1; 242/388.2; 242/579; 242/580

(58) Field of Classification Search .................. 242/378, 242/378.1–378.4, 388, 388.1–388.2, 579, 242/580, 608.5–608.6, 609.3
See application file for complete search history.

(56) References Cited

U.S. PATENT DOCUMENTS

| | | | |
|---|---|---|---|
| 4,150,798 A | 4/1979 | Aragon | |
| 4,779,816 A | 10/1988 | Varlet | |
| 5,265,822 A * | 11/1993 | Shober et al. | 242/388.2 |
| 5,588,626 A * | 12/1996 | Yang | 242/378.1 |
| 5,762,281 A | 6/1998 | Foley | |
| 5,779,175 A | 7/1998 | Shirahase | |
| 5,915,640 A | 6/1999 | Wagter | |
| 6,065,708 A | 5/2000 | Matsubara | |
| 7,546,969 B2 * | 6/2009 | Kuramoto | 242/388.1 |
| 2003/0201358 A1 * | 10/2003 | Ting | 242/388.1 |
| 2006/0071113 A1 | 4/2006 | Dente | |
| 2006/0266864 A1 | 11/2006 | Hade | |
| 2007/0108333 A1 * | 5/2007 | Kuramoto | 242/395 |

* cited by examiner

*Primary Examiner*—Sang Kim
(74) *Attorney, Agent, or Firm*—D'Ambrosio & Menon, LLP; Jo Katherine D'Ambrosio; Usha Menon (57) ABSTRACT

Cord organizers including a first shell, a second shell, and a spindle connecting the first shell and the second shell. The inside face of the first shell is held proximate the inside face of the second shell with a gap there between. The cord organizer is configured to allow the user to manually wind the cord around the spindle. The cord organizer may comprise containment surfaces extending from the inside face of the first shell and/or the inside face of the second shell as well as opposing elastomeric grips connected to the inside faces of the shells, so that the elastomeric grips encircle the spindle to receive and clamp the connection end and the listening end of the cord between the first elastomeric grip and the second elastomeric grip. A cord restraint is used to hold the cord close to the spindle and the inside face of one of the shells.

14 Claims, 12 Drawing Sheets

AUDIO CORD ORGANIZER

FIELD OF THE INVENTION

This application is based on and claims the benefit of priority from U.S. provisional application Ser. No. 61/135,250, filed Jul. 18, 2008

The invention relates to cord organizers. In particular, the invention relates to audio cord organizers.

BACKGROUND

Many modern devices use cords to transmit analog or digital signals. Despite the recent advances in wireless technology, cords are often the preferred means of transmission because they may transmit the signal more effectively and require less power than other means. Cords may also be inexpensive and simply implemented.

However, cords are easily tangled, and a tangled cord becomes more cumbersome to use. Also, the diligence involved in avoiding tangling the cord may cause displeasure in the user. To remedy these disadvantages, cord organizers have been developed to neatly store cords and allow increased control in manipulating the cords.

One common use for cords is for connecting ear buds or speakers with a personal media player. Personal media players are typically small and lightweight, which have contributed to their popularity. Personal media players are often worn on the body and are commonly used while exercising. These modes of use increase the likelihood of entanglement of a cord used in connection with a personal media player. These modes of use may also increase the likelihood that entanglement results in a safety hazard. Thus, it is desirable to employ a cord organizer while using a cord with a personal media player in the above manner.

Cords connected to personal media players used while exercising or worn on the body require frequent adjustment. For example, a user listening to music may carry a player while walking home, place the player in a pants pocket while cleaning the house, and then place the player on a desk while doing paperwork. The appropriate length of cord is different in each mode of use.

In another example, a user listens to music while exercising. While running, a large length of cord is needed to allow full range of motion. When switching to another upright exercise, a medium length is needed to prevent dangerous entanglement with limbs or exercise equipment. When switching to a seated exercise, a short length is required to avoid accident.

Historically, cord organizers have been difficult to use or easily broken. Some involve complex combinations of moving parts for winding the cord which are likely to malfunction. In addition to lacking reliability, past cord organizers are not appropriate for organizing cords while the cords are being used in close proximity to the human body, especially during exercise.

SUMMARY

Disclosed herein are cord organizers including a first shell having an inside face and a perimeter, a second shell having an inside face and a perimeter, and a spindle connecting the first shell and the second shell such that the inside face of the first shell is held proximate to the inside face of the second shell so that a gap is defined between the first shell and the second shell. The gap extends around the radius of the spindle and is configured to allow the user to manually wind the cord around the spindle so both ends of the cord extend past the gap. In one embodiment, the cord organizer comprises a first shell that is detachable from a second shell to facilitate winding and unwinding of the cord for easy adjustment of the effective cord length. The cord may be an audio cord of a personal media player. The cord organizer may be light enough to hang from the cord between the ear bud end of the cord and the end of the cord connected to the personal media player.

In one embodiment, the cord organizer may comprise one or more containment surfaces extending from the inside face of the first shell and/or the inside face of the second shell. The containment surfaces contain the cord, after winding, within the gap so as to further maintain the cord in a wound configuration until adjusted by the user.

The containment surface may comprise an elastomeric fence at the perimeter of the first shell connected to the inside face of the first shell and/or a second elastomeric fence at the perimeter of the second shell. In another embodiment, the containment surface may include an elastomeric post at the perimeter of the first shell extending from the inside face of the first shell and/or a second elastomeric post opposite the first post at the perimeter of the second shell extending from the inside face of the second shell. Additional pairs of posts may be positioned around the perimeter. The posts may be configured to contain either or both of the ear buds and the cord in a wound position.

In one embodiment, the cord organizer may include opposing elastomeric grips connected to the inside faces of the shells, wherein the elastomeric grips encircle the spindle and are adapted to receive and clamp the two ends of the cord between the first elastomeric grip and the second elastomeric grip so as to maintain the cord in a static wound configuration until adjusted by the user.

In one embodiment, the cord organizer may include a cord restraint, such as a groove in the spindle or a hook attached to the spindle, to hold the cord close to the inside face of one of the shells so that the cord may be more tightly wound, thereby saving space and weight. The first shell comprises a restraint end adjacent to the cord restraint. The first shell may be connected to the spindle at the restraint end. The first shell may comprise a connector that couples to the spindle. The connector may comprise a receiving cylinder adapted to receive the spindle. In some embodiments, the spindle may comprise one or more male mating members around the circumference of the spindle at the restraint end. The receiving cylinder may comprise one or more female mating members adapted to receive one or more male mating members to engage the spindle. In other embodiments, the connector may comprise a mounting hub extending from the inside face of the first shell with one or more male mating members on the circumference of the mounting hub. The spindle may comprise a receiving tube adapted to receive the mounting hub. The receiving tube may comprise one or more female mating members adapted to receive the one or more male mating members to engage the mounting hub. The first shell may be detachable from the second shell. In one embodiment, the spindle may be detachable for receiving the cord within the cord restraint. The spindle may then be reattached so that the cord restraint and the inside face of the first shell bracket the received cord.

DETAILED DESCRIPTION

Disclosed herein are cord organizers including a first shell having a first inside face and a first perimeter, and a second shell, detachable from the first shell. The second shell comprises a second inside face, a second perimeter, and a spindle for connecting the first shell to the second shell. The inside face of the first shell is held proximate to the inside face of the second shell so that a gap is defined between the first shell and the second shell. The gap extends around the radius of the spindle and is configured to allow the user to manually wind a cord around the spindle so both ends of the cord may extend past the gap.

The cord organizer with the first shell detachable from the second shell facilitates winding and unwinding of the cord for easy adjustment of the effective cord length. The cord may be an audio cord of a personal media player and comprises a listening end, adjacent to ear buds, and a connecting end that attaches to the media player. The cord organizer may be light enough to hang from the cord between the ear bud end of the cord and the end of the cord connected to the personal media player. The cord organizer may also organize the cord as it is stored and waiting for use. Specific design details have been provided for illustration but should not be considered limiting. Readers of skill in the art will recognize that many variations of these illustrative embodiments may be implemented consistent with the scope of the invention as described by the appended claims.

Figure 1A:
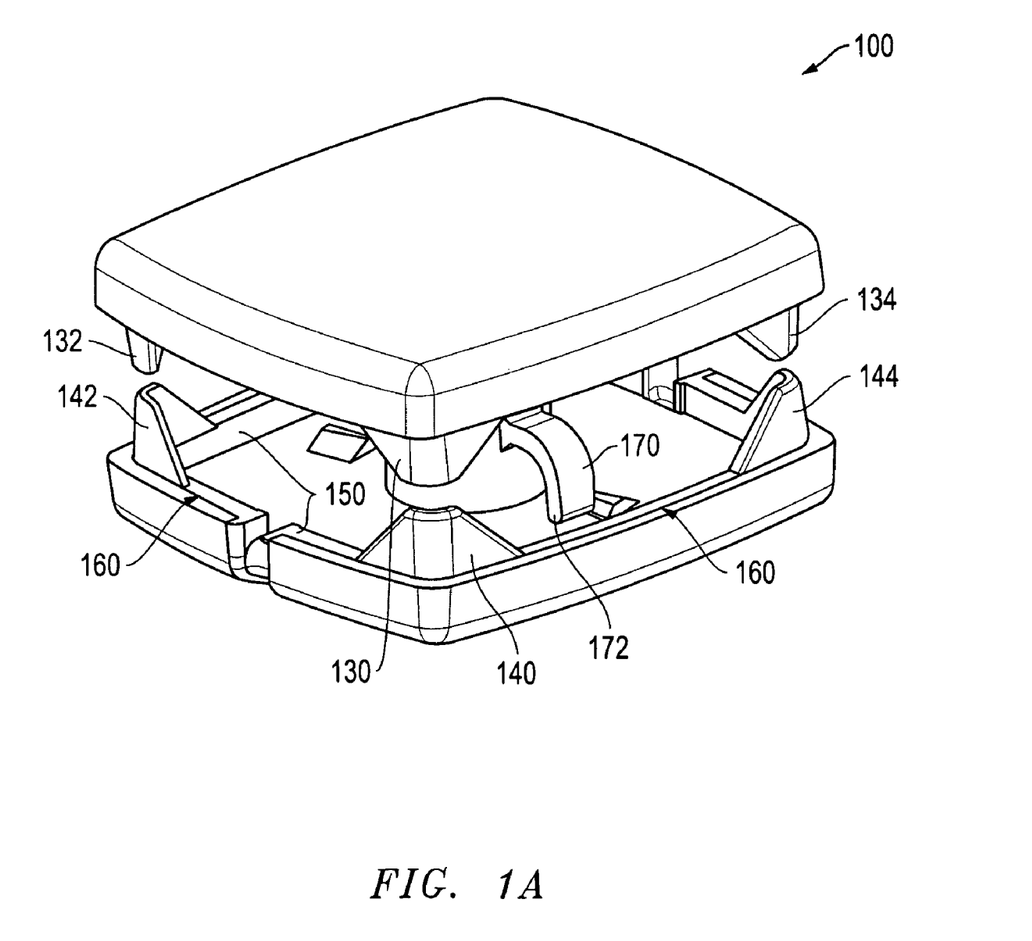
FIGS. 1A-C show perspective views of an exemplary cord organizer.
Figure 1B:
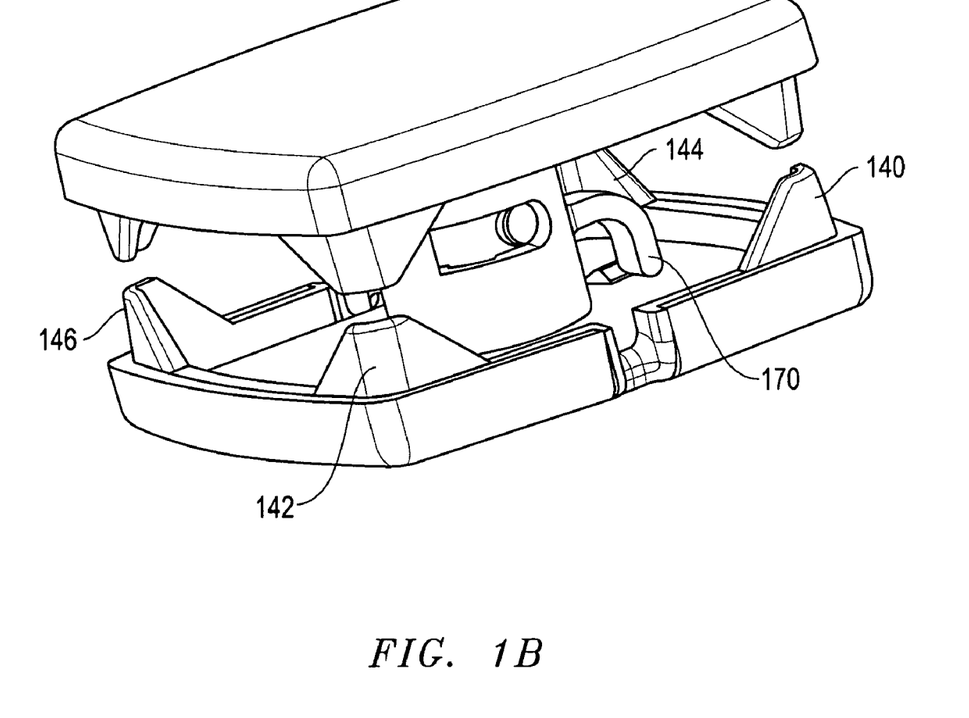
Figure 1C:
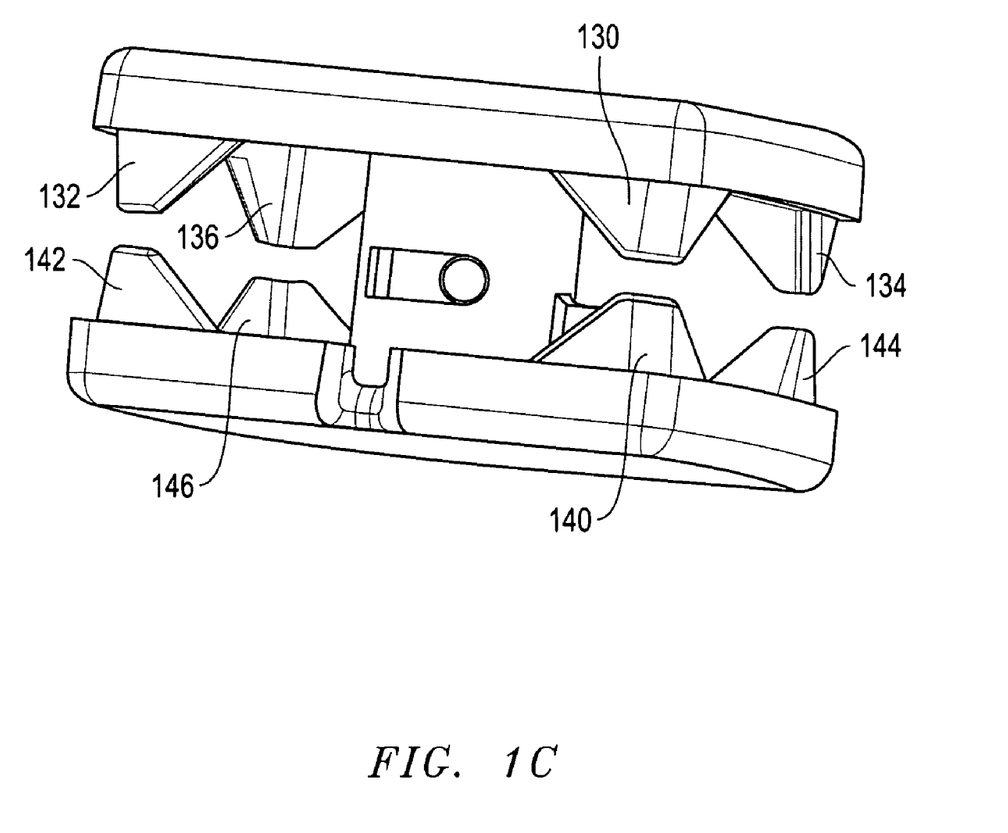
Figure 2:
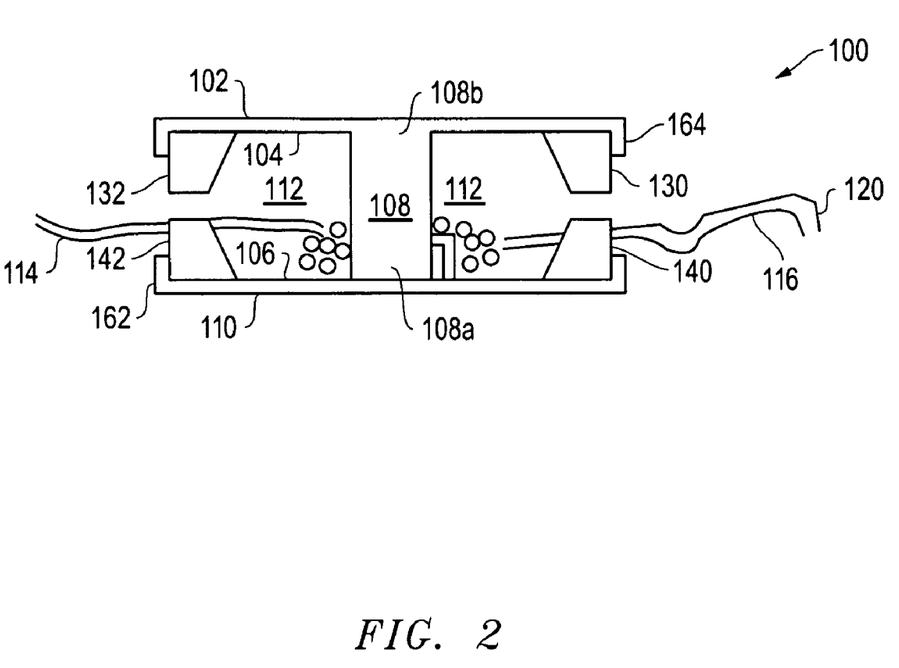
FIG. 2 shows an exemplary cord organizer and cord from a cross-sectional view.

FIGS. 1A-C show perspective views of an exemplary cord organizer. FIG. 2 shows an exemplary cord organizer and cord from a cross-sectional view. As per FIG. 2, the cord organizer 100 includes a first shell 110, a second shell 102, and a spindle 108 connecting the first shell 110 and the second shell 102. First shell 110 includes a perpendicular flange 162, and the second shell 102 includes a perpendicular flange 164. In other embodiments, the shells may not include a flange. A first inside face 106 of the first shell 110 is held proximate to the second inside face 104 of the second shell 102 with a gap 112 defined between the first shell 110 and the second shell 102. The gap 112 extends around the radius of the spindle 108 and is configured to allow the user to manually wind the cord 120 around the spindle 108 so that the connection end 114 and the listening end 116 of the cord 120 extend past the gap 112. The spindle 108 may range from 7/16-inches to 3/4-inches or larger. The shells of FIGS. 1A-2 are square, but the shells may be any regular geometric shape (circle, triangle, diamond, elliptical, ovoid, star, asterisk) or any irregular geometric shape (cartoon characters, personal likenesses, or other shapes not easily definable by mathematic function).

As seen in FIG. 1A, the cord organizer 100 may include one or more containment surfaces 160 extending from the inside face of one or more of the shells. The containment surfaces 160 contain the cord, after winding, within the gap so as to further maintain the cord in a wound position until adjusted by the user. FIGS. 1A-2 illustrate an embodiment having elastomeric posts 130, 140 as containment surfaces 160. In FIGS. 1A-2, a first elastomeric post 140 is connected to the inside face 106 of the first shell 110 and a second elastomeric post 130 is connected to the inside face 104 of the second shell 102 adjacent to the first elastomeric post 140. In this embodiment, the cord organizer is generally shaped as a square, with similar posts 140, 142, 144, 146 at the corners of the inside face 106 of the first shell 110 and opposing posts 130, 132, 134, 136 at inside face 104 of the second shell 102. The first elastomeric post 140 (as well as other elastomeric posts 142, 144 and 146) is part of an elastomeric ring 150 that is molded to perpendicular flange 162. A similar ring (not shown) is molded to perpendicular flange 164. The cord organizer may have more or fewer posts at various regular or irregular spacings in various implementations. Other implementations may include separately mounted posts, an elastomeric sheet covering a portion of the inside faces of the shells and comprising a ring (as is discussed below with reference to FIG. 4). Alternatively, the posts may be connected to the inside face by adhesives, mechanical means (e.g., slots, protrusions, mating members), and so on. The containment surfaces 160 may directly oppose one another, as shown in FIGS. 1A-2, or may be offset (not shown). The cord 120 may be from 0.05 to 0.1 inches (approximately 1.3 to 2.5 millimeters), and a standard cord may be 0.08 inches (approximately 2 millimeters). The space between the posts may be from 0.04 inches to 0.10 inches (approximately 1 millimeter to 2 millimeters).

In some embodiments, the cord organizer may include a cord restraint attached to the spindle to hold the cord close to the inside face of one of the shells so that the cord may be more tightly wound, thereby saving space and weight of the cord organizer. By holding the cord close to the bottom of the spindle, an unexpected increase in winding density for the cord is achieved. In some implementations, the spindle 108 comprises a restraint end 108a. In this embodiment, the cord restraint 170 comprises a hook 172 attached to the spindle 108 at the restraint end 108a for this function.

Referring to FIGS. 1A-C and 1B, the spindle 108 comprises a hook 172 comprising a tip 174 extending away from the non-restraint end 108b. Upon attaching the first shell, the tip 174 of the hook 172 may be flush with the inside face 106 of the first shell 110. In some implementations, the cord may be forced inside the hook 172 to hold the cord close to the inside face of one of the shells. The cord organizer may also be implemented so that the first shell must be removed to place or remove the cord from the hook.

In some embodiments, one or both shells are detachable from the spindle. In FIGS. 1A-2, the first shell is connected to the spindle 108 at the restraint end 108a, and the spindle is detachable. The first shell 110 may comprise a connector on the inside face that couples the spindle to the first shell. The connector may comprise a receiving cylinder 416 (shown in FIG. 4) adapted to receive the spindle 108. In other embodiments, the connector may comprise a mounting hub 302 extending from the inside face 106 of the first shell 110, and the spindle 108 may comprise a receiving tube 340 adapted to receive the mounting hub 302. The non-restraint end 108b is connected to the second shell 102. The spindle 108 and the second shell 102 may be manufactured as one piece. Alternatively, the spindle 108 and the second shell 102 may be permanently connected in a manner similar to the containment surfaces described above.

Figure 3A:
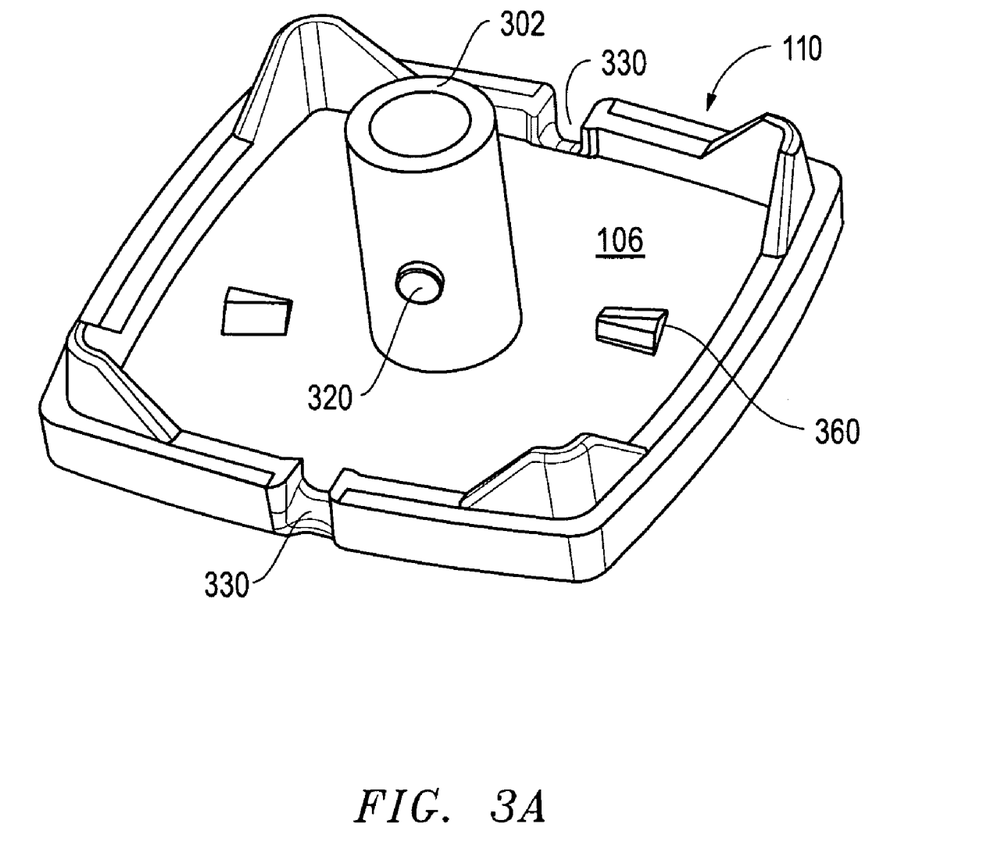
FIG. 3A illustrates the first shell detached from the spindle.
Figure 3B:
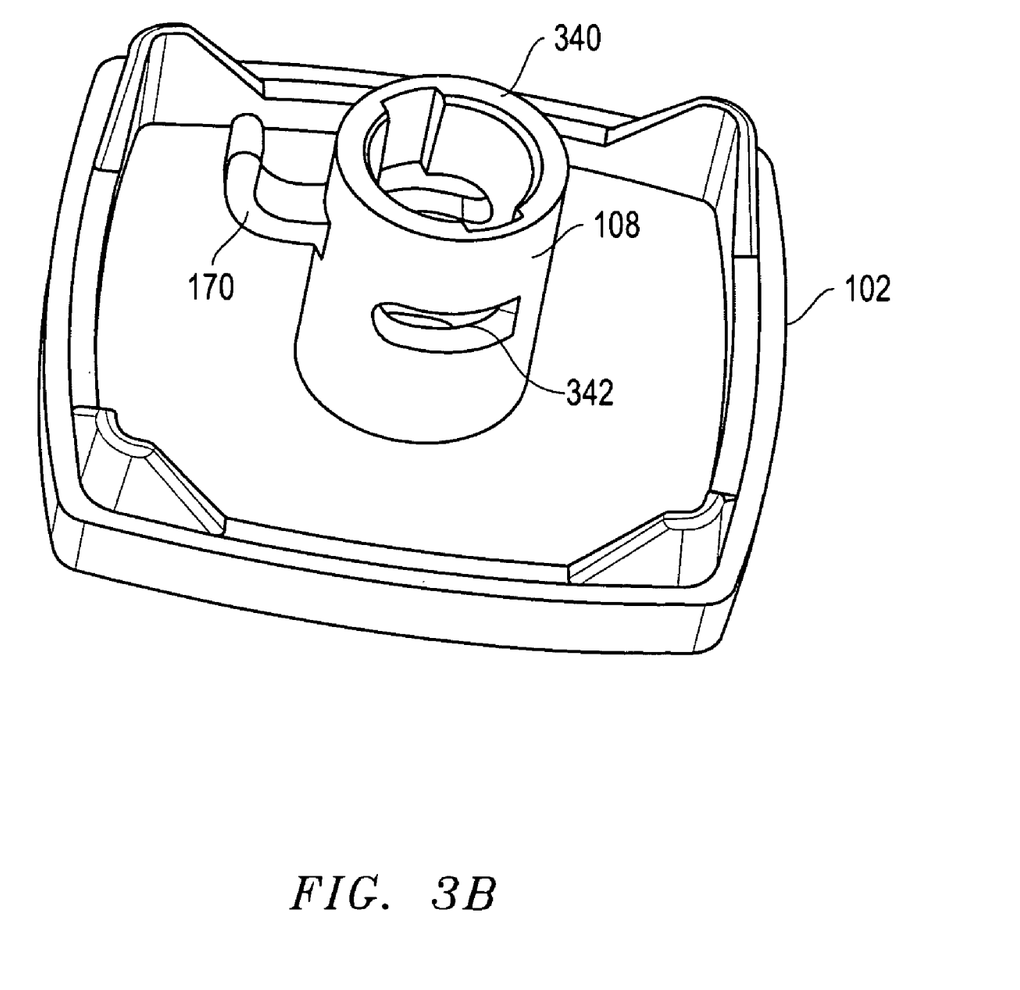
FIG. 3B illustrates the second shell and spindle without the first shell attached.

FIG. 3A illustrates the first shell detached from the spindle. FIG. 3B illustrates the second shell and spindle without the first shell attached. Referring to FIGS. 3A and 3B, the spindle 108 has a hook 172, now uncovered, for receiving the cord within the hook 172. The first shell 110 may have any number of pockets 330 configured to temporarily receive either the connection end 114 or the listening end 116 of the cord while placing the cord 120 in the hook 172 or winding the cord 120. The first shell 110 is re-attachable to the spindle 108, so that the hook 172 and the inner face 106 of the first shell 110 bracket the received cord 120. The detachable shell also allows various types of cord 120 as found with different personal media players to be used with the cord organizer. Because it is not required to buy the cord and organizer as a unit according to this invention, the satisfactory cords previously employed by the user are not made obsolete by the organizer. This feature not only decreases costs to the user, but also allows the use of proprietary media cords and those cords already known by the user to be of good quality.

Referring to FIG. 3A, in some embodiments, the first shell 110 comprises a mounting hub 302 extending from the inner face 106 of the first shell 110. In one aspect of this invention the mounting hub 302 comprises one or more male mating members 320 positioned around the circumference of the mounting hub 302. In this figure, the male mating members 320 are tabs. Referring again to FIG. 3B, in this embodiment, the spindle 108 that is attached to the second shell comprises a receiving tube 340 which is adapted to receive the mounting hub 302. The receiving tube 340 defines one or more female mating members 342 adapted to receive the one or more male mating members 320 to engage the mounting hub 302. In FIG. 3B, the female mating members 342 are slots. The tabs 320 are engaged in the slot 342 by inserting the mounting hub 302 into the receiving tub 340 and rotating the first shell 110 with respect to the spindle 108. Once engaged, the slot 342 prohibits axial motion of the spindle 108 with respect to the first shell 110.

In some embodiments, fasteners may be used to maintain the tab 320 in an engaged state. Referring again to FIG. 3A, the inside face of the first shell 110 comprises a protrusion 310. The slot 342 is perpendicular to the spindle 108 and at a position on the receiving tube 340 so that, while rotating the first shell with respect to the spindle to engage the tab 320 in the slot 342, the protrusion 310 lies in the path of the hook 172. The protrusion may be smooth, prismatic, or ramp-shaped. The hook 172 deforms upon encountering the protrusion 310 so as to clear the protrusion 310, and substantially returns to form once past the protrusion 310, such that the protrusion 310 constrains the hook 172. Constraining the hook 172 prohibits rotation of the first shell 110 with respect to the spindle 108, so that the tab 320 is kept engaged in the slot 342. Thus, the protrusion attaches the first shell 110 to the spindle 108 in cooperation with the tab 320 and the slot 342. Alternatively, a depression may be used to maintain the hook 172 instead of a protrusion, or one or multiple depressions and/or protrusions may be used in combination. In some implementations, the male and female mating members are configured as a bayonet or twist-lock connector, locking tabs, and so on.

Figure 4:
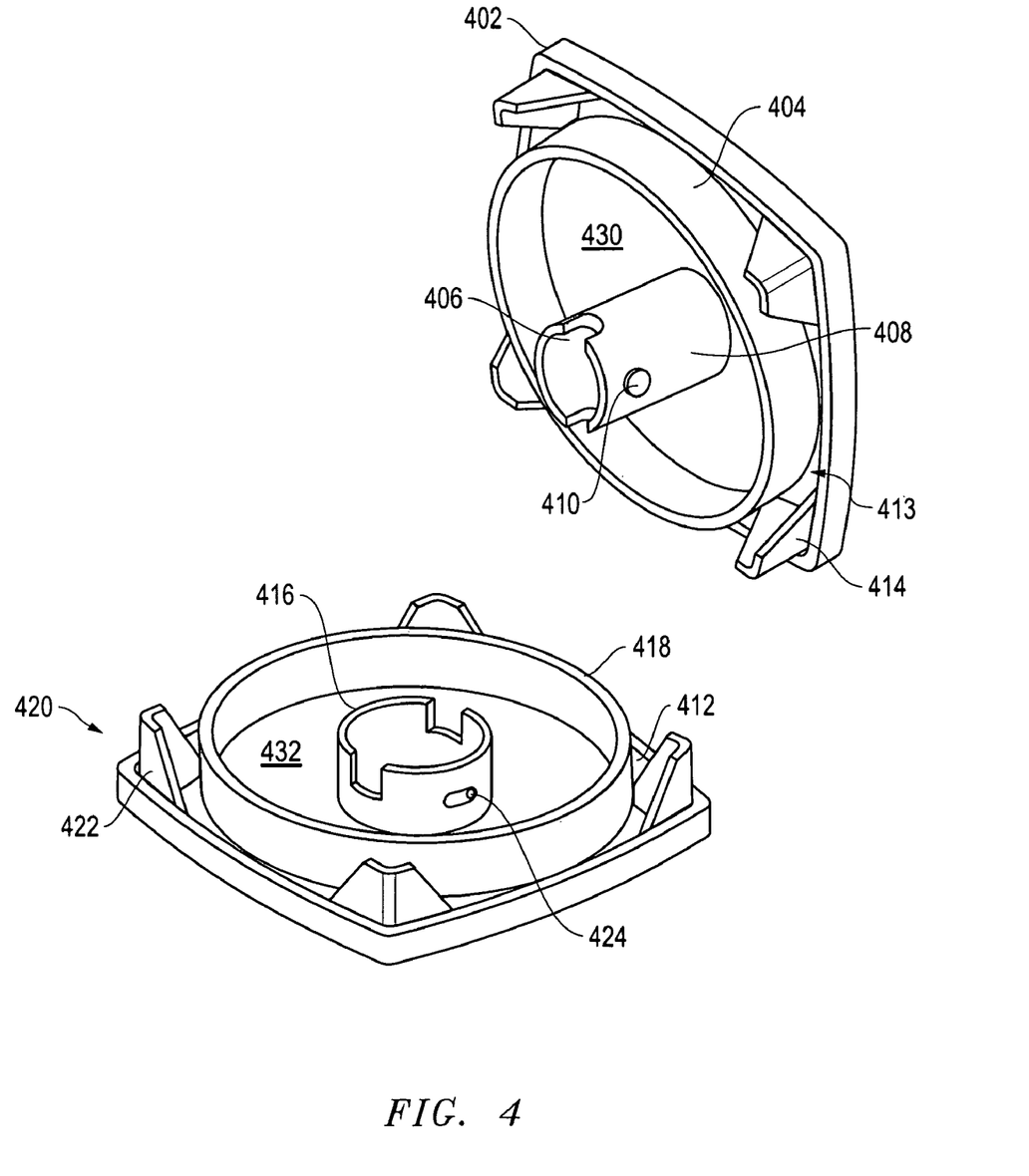
FIG. 4 shows an exemplary cord organizer with one shell detached for insertion of a cord into a groove of the spindle.

In alternative embodiments, in the place of or in addition to the hook 172, the cord organizer may include other types of collars or restraints for containing the cord proximate to the spindle. FIG. 4 illustrates an exemplary cord organizer 400 with one shell detached for insertion of a cord into a groove 406 of the spindle. The spindle 408 comprises the groove 406 at one end (the restraint end). The groove 406 may extend longitudinally to run parallel with the axis of the spindle 408. The groove 406 may extend laterally to run diametrically through the spindle 408 or through a chord parallel to the diameter. In this embodiment, the first shell 420 is detachably connected to the second shell 402 by means of the spindle 408. The first shell 420 can be detached from the spindle 408 in order to lay the cord across the groove 406, and then reattached so the cord is confined within the spindle 408. The first shell 420 may comprise a receiving cylinder 416 adapted to receive the spindle 408 so that the first shell 420 detaches from the second shell 402 when the spindle 408 is removed from the receiving cylinder 416.

In some embodiments, the spindle 408 may comprise one or more male mating members, such as tabs 410, and the receiving cylinder 416 may comprise one or more female mating members, such as slots 424, adapted to receive the male mating members to engage the spindle 408. Similar connection mechanisms may be used as those described above in reference to FIG. 3.

In various embodiments, the hook or groove may be limited to an open depth or a width of 1.25 times that of the cord for which the cord organizer is designed in order to facilitate tight winding, as discussed above. In other instances the hook or groove may be limited to an open depth not exceeding one-half or one-third of the spindle length.

Figure 5A:
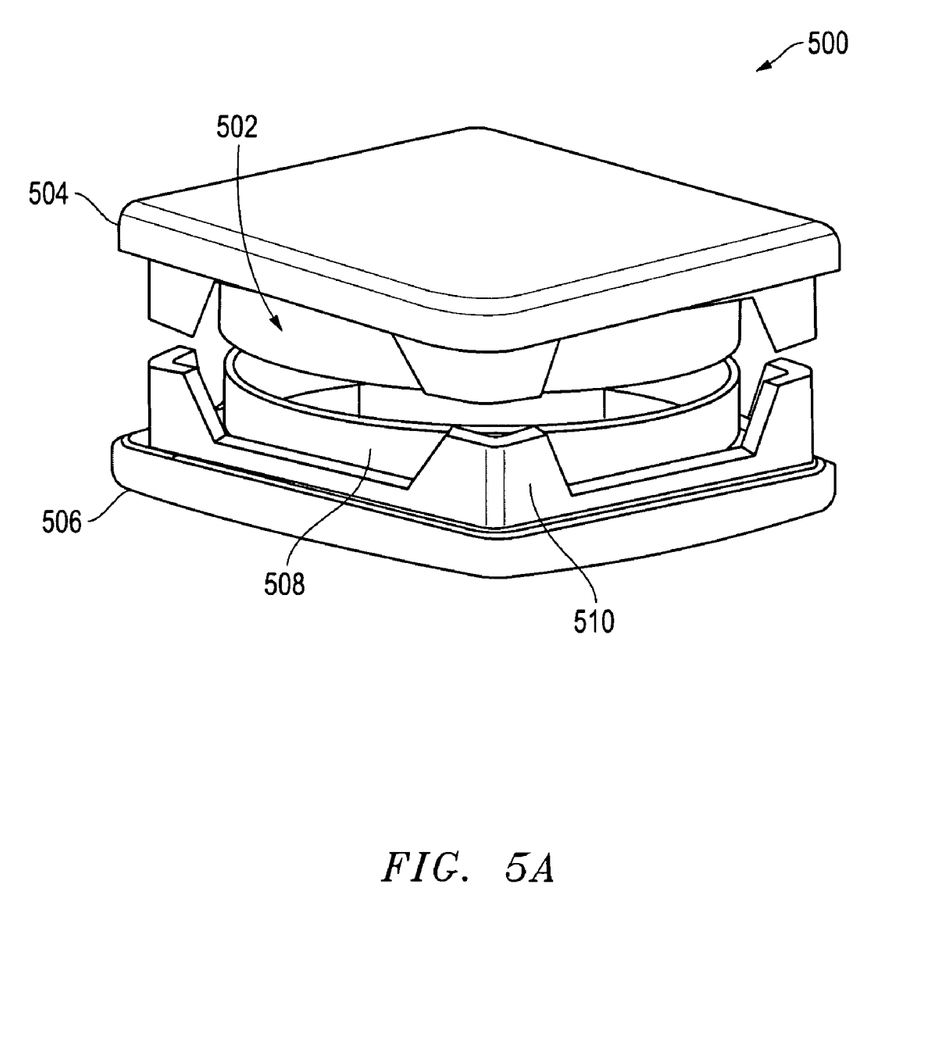
FIG. 5A shows a perspective view of an exemplary cord organizer with two opposing fences in addition to posts.
Figure 5B:
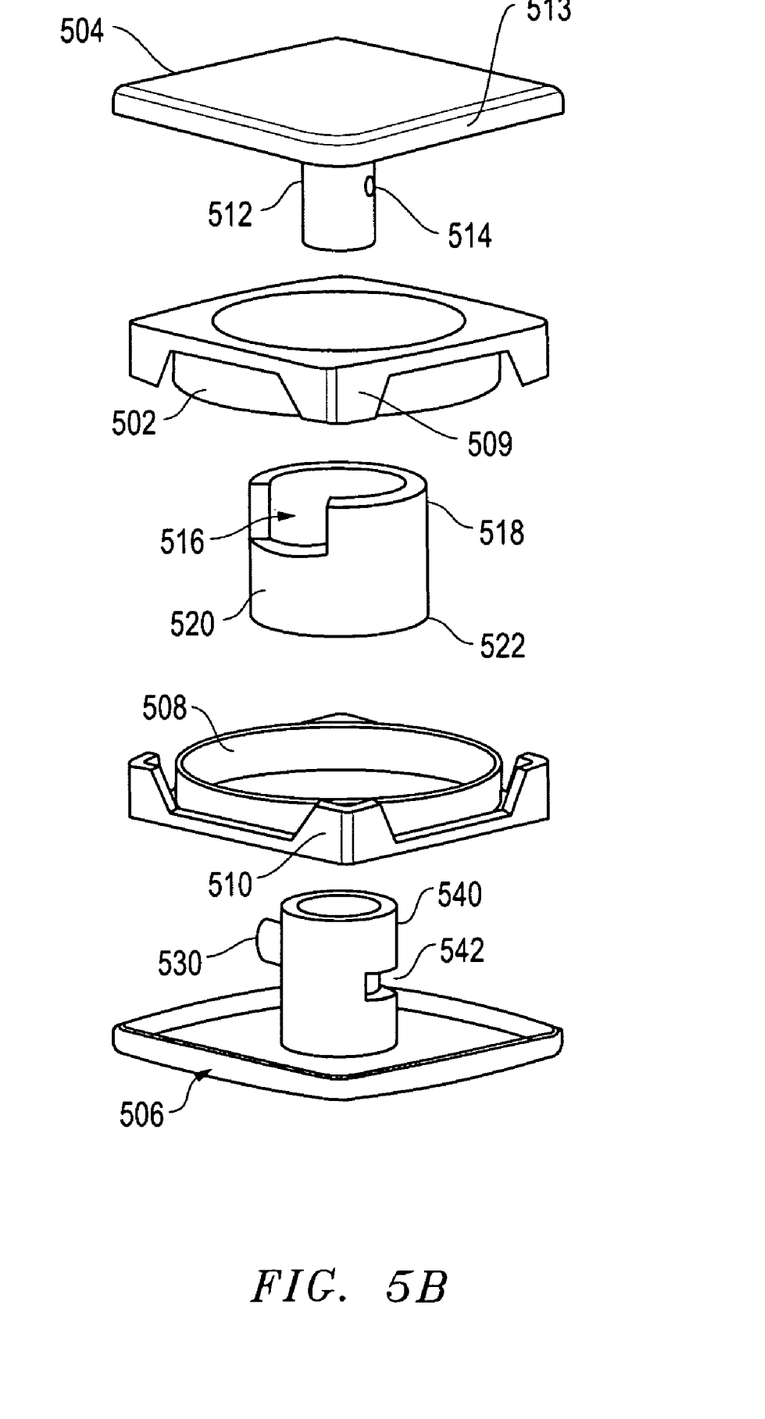
FIG. 5B shows an exploded view of an exemplary cord organizer with two opposing fences in addition to posts.

The cord organizer may have more than one type of containment surface. FIG. 5A shows a perspective view of an exemplary cord organizer 500 with two opposing fences in addition to posts. FIG. 5B shows an exploded view of the same exemplary cord organizer 500. In FIG. 5A, the containment surface includes a first elastomeric fence 502 at the perimeter of the first shell 504 connected to the inside face of the first shell; and a second elastomeric fence 508 at the perimeter of the second shell 506 connected to the inside face of the second shell opposite the first elastomeric fence. The elastomeric fences 502 and the posts 509 are formed as a continuous piece of elastomeric material. The elastomeric fences 508 and the posts 510 are likewise formed as a continuous piece of elastomeric material. The elastomeric fences 502, 508 encircle the spindle and contain the cord after winding so as to further maintain the cord in a wound configuration until adjusted by the user, but do not grip the cord. Referring to FIG. 5B, the first shell 504 has at least one pocket 513 configured to temporarily receive either the connection end or the listening end of the cord while winding the cord.

For a cord measuring from 0.05 to 0.1 inches in width or thickness (approximately 1.3 to 2.5 millimeters), the space between the fences may be 0.1 inches (approximately 2.5 millimeters) or larger. In some embodiments, the space between each pair of posts may be less than the space between the fences. In such embodiments, the space between the posts may be 0.05 inches (approximately 1.3 millimeters).

In some embodiments, the cord organizer includes a detachable adaptor hub 520 encircling the spindle to provide a greater diameter for winding. For example, the original spindle diameter may be set to 0.5 inches or more, while the outside diameter of the adaptor hub 520 may be 0.75 inches or more. A shorter cord may be wound more easily on the larger diameter hub, but may not provide enough winding space for a longer cord. The detachable adaptor hub 520 includes a tubular housing having a first end 518 resting flush against the inside face of the first shell and a second end 522 opposite the first end. The second end rests flush against the inside face of the second shell. In the cord organizer of FIG. 5B, the tubular housing has a cutout 516 for receiving the hook 530 so that the hook 530 is uncovered for receiving the cord.

Figure 6:
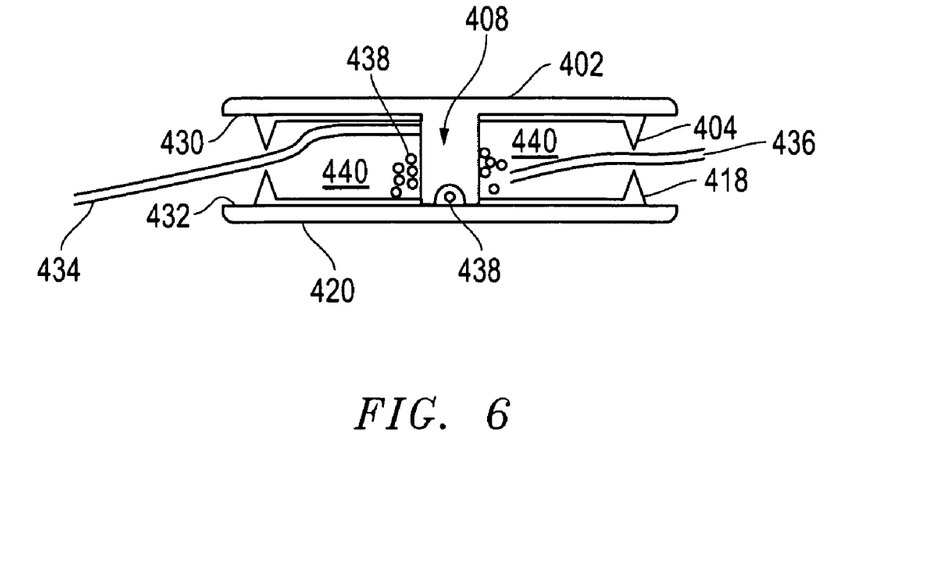
FIG. 6 shows a cross-sectional view of an exemplary cord organizer with two elastomeric grips.
Figure 7A:
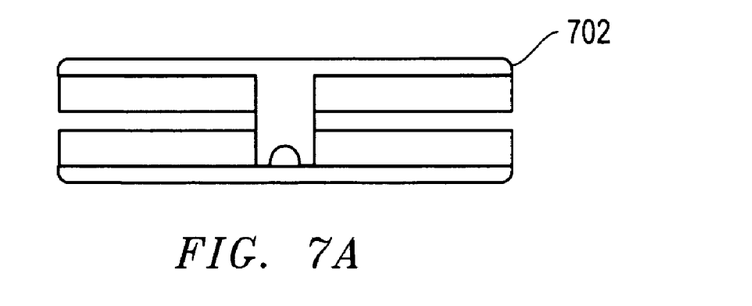
FIG. 7A shows a cross-sectional view of an exemplary cord organizer with two elastomeric grips.
Figure 7B:
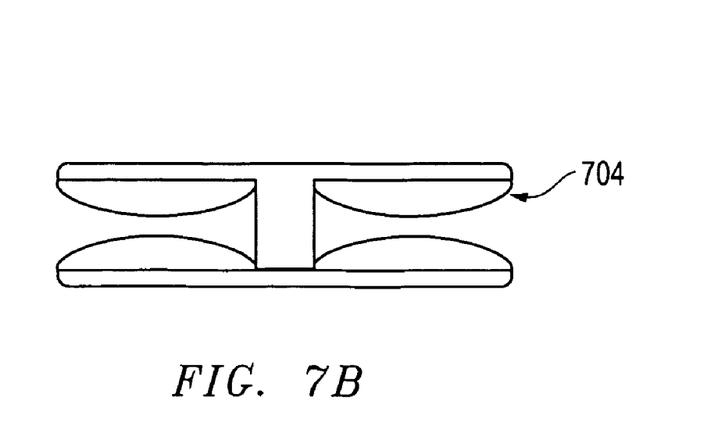
FIG. 7B shows a cross-sectional view of an exemplary cord organizer with two elastomeric grips.

Returning to FIG. 4, in some embodiments, the cord organizer employs mechanisms in place of or in addition to the containment surfaces for preventing unwinding of the cord. FIG. 6 illustrates the same exemplary cord organizer as shown in FIG. 4 from a cross-sectional view. As per FIG. 6, the cord organizer includes a first shell 420, a second shell 402, and a spindle 408 connecting the first shell 420 and the second shell 402. The diameter of the spindle may range from 7/16-inches to 3/4-inches or larger. In the embodiment of FIG. 6, a first elastomeric grip 418 is connected to the inside face 432 of the first shell 420 and a second elastomeric grip 404 is connected to the inside face 430 of the second shell 402 adjacent to the first elastomeric grip 418. In one aspect of this invention, the first and second shells each have a perimeter 412, 413 respectively, and the elastomeric grips 418, 404 encircle the perimeters 412, 413 of the inside faces 432, 430 of the shells 420, 402. The grips 404, 418 may be attached in a similar manner to attaching the containment surfaces, as described above. The grips 404, 418 may directly oppose one another, as shown in FIG. 6, or may be offset (not shown). The grips 404, 418 are adapted to receive and clamp the connection end 434 and the listening end 436 of the cord 438 so as to maintain the cord 438 in a static wound configuration until adjusted by the user. The grip 404, 418 and the posts 414, 422 of each shell are respectively manufactured as a single elastomeric sheet, which covers a portion of the inside face of either shell. The width or diameter of the cord 438 may be from 0.05 to 0.1 inches (approximately 1.3 to 2.5 millimeters), and a standard cord 438 may be 0.08 inches (approximately 2 millimeters). The space between the grips may be from 0.04 inches to 0.08 inches (approximately 1 millimeter to 2 millimeters). Referring again to FIG. 4, the grips 404, 418 encircle the spindle. As shown in FIG. 6, the grips 404, 418 are ridges. However, the grips could also be diaphragms 702, 704, as shown in FIG. 7A and FIG. 7B, or other grip shapes as will occur to those of skill in the art.

In some embodiments, the cord organizer may be restricted to maximum sizes or weight to facilitate use during exercise or other uses in close proximity to the human body. Specifically, the cord organizer may be configured to hang from the listening end 436 of a personal media player cord without dislodging the ear buds from the user's ears. In such embodiments, the cord organizer weighs less than 20 grams and has a thickness (width) of 1 to 4 centimeters and preferably a thickness of 1 to 2 centimeters. In such embodiments, each shell has a surface of no greater than 20 square centimeters.

In one embodiment, the method for organizing a wound audio cord comprises providing a first shell and a second shell, the first shell comprising a first inside face and a first perimeter, and the second shell comprising a second inside face and a second perimeter. The method further comprises attaching the first shell to the second shell with a connector so that the first inside face is held proximate to the second inside face, leaving a gap between the first shell and the second shell, allowing the user to manually wind the cord around the connector, with the listening end extending past the gap. The next step comprises restraining the cord proximate the connector, and containing the wound cord within the gap using one or more containment surfaces on the perimeter of either the first shell or second shell, to maintain the cord in a wound configuration. The step of attaching the first shell to the second shell with a connector may comprise providing a cord restraint on the connector, using the cord restraint to position the cord close to the spindle and the inside face of the first shell.

Figure 8:
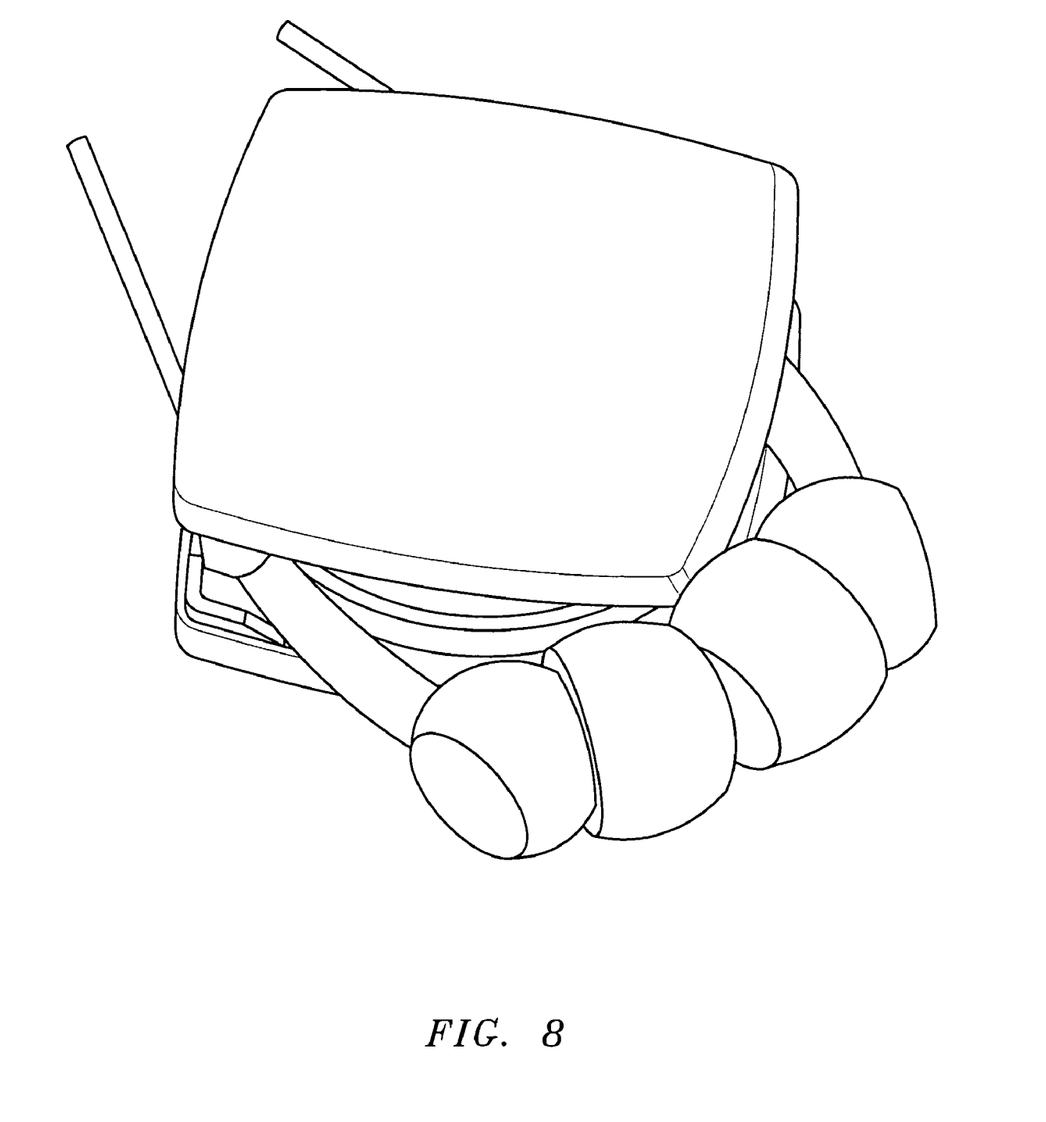
FIG. 8 a perspective view of a cord organizer holding ear buds between elastomeric grips and one or more of a plurality of posts.

The cord organizer may also include posts 414, 422. The posts 414, 422 may be adapted for receiving and holding ear buds attached to the listening end 436 of the cord 438. The posts may be elastomeric. As shown in FIG. 8, the cord organizer may be configured to receive and hold the ear buds between the elastomeric grips and one or more of the plurality of posts.

Figure 9:
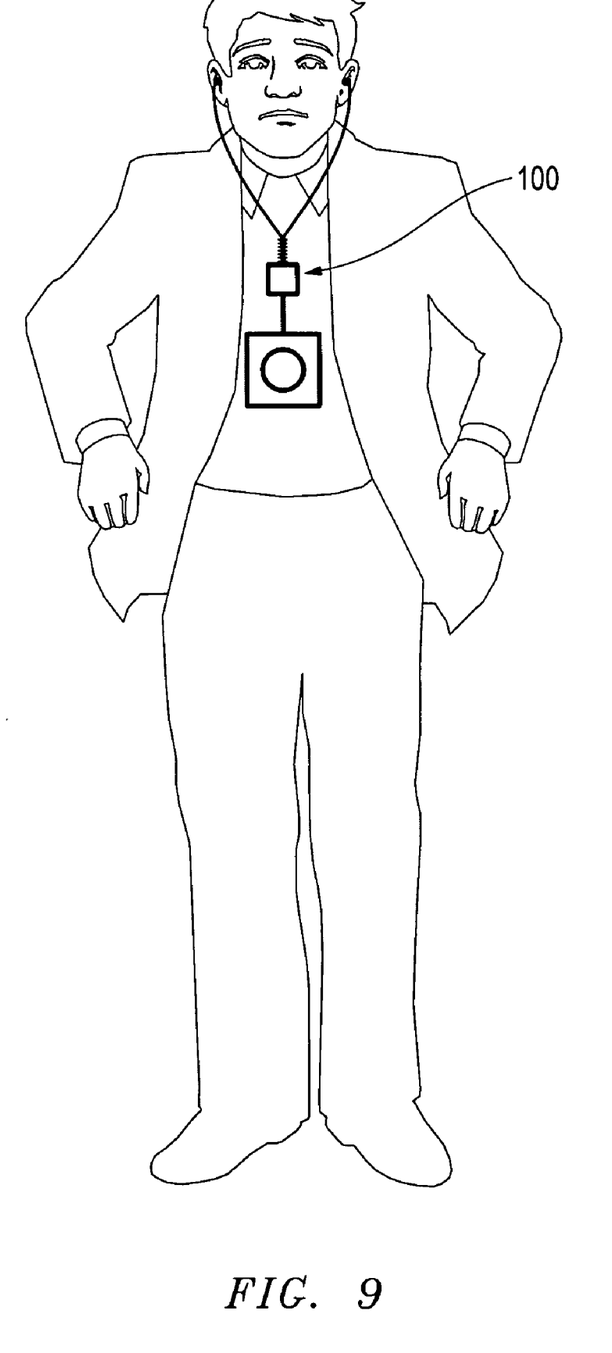
FIG. 9 illustrates a user wearing the cord organizer.

FIG. 9 illustrates a user wearing the cord organizer. The cord organizer is integrated with the personal media player by winding the cord of the personal media player in the cord organizer and plugging in the cord. The light weight of the organizer allows the user to dangle the organizer from the cord, which is supported only by the ear buds in the user's ears. The cord organizer may be used with any model of cord.

It should be understood that the inventive concepts disclosed herein are capable of many modifications. Such modifications may include modifications in the type of materials used for the shells, grips, and inner surfaces, the exact dimensions of the organizer including the gap and spaces between ridges or inner surfaces, and the implementation of a restraint for the cord (e.g., spindle groove, hook, etc.). To the extent such modifications fall within the scope of the appended claims and their equivalents, they are intended to be covered by this patent.

What is claimed is:

1. A cord organizer for storing an audio cord of a user, the cord having a connection end and a listening end, the cord organizer comprising:
   a first shell having a first inside face and a perimeter;
   a second shell having a second inside face and a perimeter;
   a spindle connecting the first shell and the second shell such that the first inside face is held proximate to the second inside face;
   a gap defined between the first shell and the second shell, the gap extending around the radius of the spindle and when the cord is in a wound position around the spindle, the connection end and the listening end extend past the gap;
   a cord restraint connected to the spindle, the cord restraint further comprising a hook, the hook comprising a tip extending away from the non-restraint end and the tip of the hook is flush with the inside face of the first shell when the spindle is in an attached position with the first shell; and
   one or more containment surfaces extending from the first inside face and the second inside face, and the cord, when in a wound configuration, is enclosed within the gap by the containment surfaces,
      wherein the spindle comprises a restraint end and a non-restraint end, the first shell connected to the spindle at the restraint end, and the spindle comprises a detachable spindle that is detachable and re-attachable to the first shell, in the detached position the spindle receives the cord within the cord restraint and in a re-attachable position, the received cord is bracketed between the cord restraint and the first inside face.

2. The cord organizer of claim 1 wherein: the first shell comprises a mounting hub extending from the first inside face, and the spindle comprises a receiving tube adapted to receive the mounting hub when the spindle and the receiving tube are in an engaged position.

3. The cord organizer of claim 2 wherein: the mounting hub comprises one or more male mating members positioned on its circumference; and the receiving tube comprises one or more female mating members adapted to receive the one or more male mating members when in an engaged position with the mounting hub.

4. The cord organizer of claim 3 wherein: at least one of the male mating members comprises a tab radially protruding from the mounting hub; and at least one of the female mating members comprises a slot in the receiving tube;

wherein the tab may be engaged in the slot by insertion of the mounting hub into the receiving tube and relative rotation of the first shell with respect to the spindle, the engagement of the tab in the slot prohibiting axial motion of the spindle with respect to the first shell.

5. The cord organizer of claim 1 wherein:

the first inside face comprises a protrusion; and the slot is perpendicular to the spindle and at a position on the receiving tube so that the protrusion lies in the path of the hook during relative rotation of the first shell with respect to the spindle to engage the tab;

wherein the hook deforms upon encountering the protrusion so as to clear the protrusion, and substantially returns to form once past the protrusion, such that the protrusion constrains the hook and attaches the first shell to the spindle in cooperation with the tab and the slot.

6. The cord organizer of claim 1 wherein the one or more containment surfaces comprise:

one or more first shell posts at the perimeter of the first shell extending from the inside face of the first shell; and one or more second shell posts opposite the first shell posts at the perimeter of the second shell extending from the inside face of the second shell.

7. The cord organizer of claim 1 wherein the gap comprises a first end and a second end opposite the first end, and when the cord is in a wound state around the spindle, the connection end extends past the first end of the gap and the listening end extends past the second end of the gap.

8. The cord organizer of claim 1 further comprising a perpendicular flange extending around the perimeter of at least one selected from the group of the first shell and the second shell.

9. The cord organizer of claim 8 wherein the one or more containment surfaces are molded to at least one of the perpendicular flanges.

10. The cord organizer of claim 1 wherein the first shell comprises at least one pocket configured to temporarily receive either the connection end or the listening end of the cord while winding the cord.

11. The cord organizer of claim 1 wherein the cord restraint extends for less than one half the length of the spindle.

12. The cord organizer of claim 1 wherein the cord organizer weighs less than 20 grams.

13. A method for organizing a wound audio cord of a personal media player of a user, the cord having a connection end and a listening end, the method comprising:

providing the cord organizer of claim 1;

restraining the cord proximate the spindle at the restraint end of the spindle; and containing the wound cord within the gap utilizing the one or more containment surfaces on the perimeter of at least one selected from the group of the first shell and the second shell so as to further maintain the cord in a wound configuration until adjusted by the user.

14. The method of claim 13 further comprising positioning the cord close to the spindle and the inside face of the first shell using the cord restraint.

\* \* \* \* \*